H. COWING.
Steam-Plow.

No. 7,795.

3 Sheets—Sheet 1

Patented Nov. 26, 1850.

H. COWING.
Steam-Plow.

No. 7,795.

3 Sheets—Sheet 2

Patented Nov. 26, 1850

H. COWING.
Steam-Plow.
No. 7,795. Patented Nov. 26, 1850
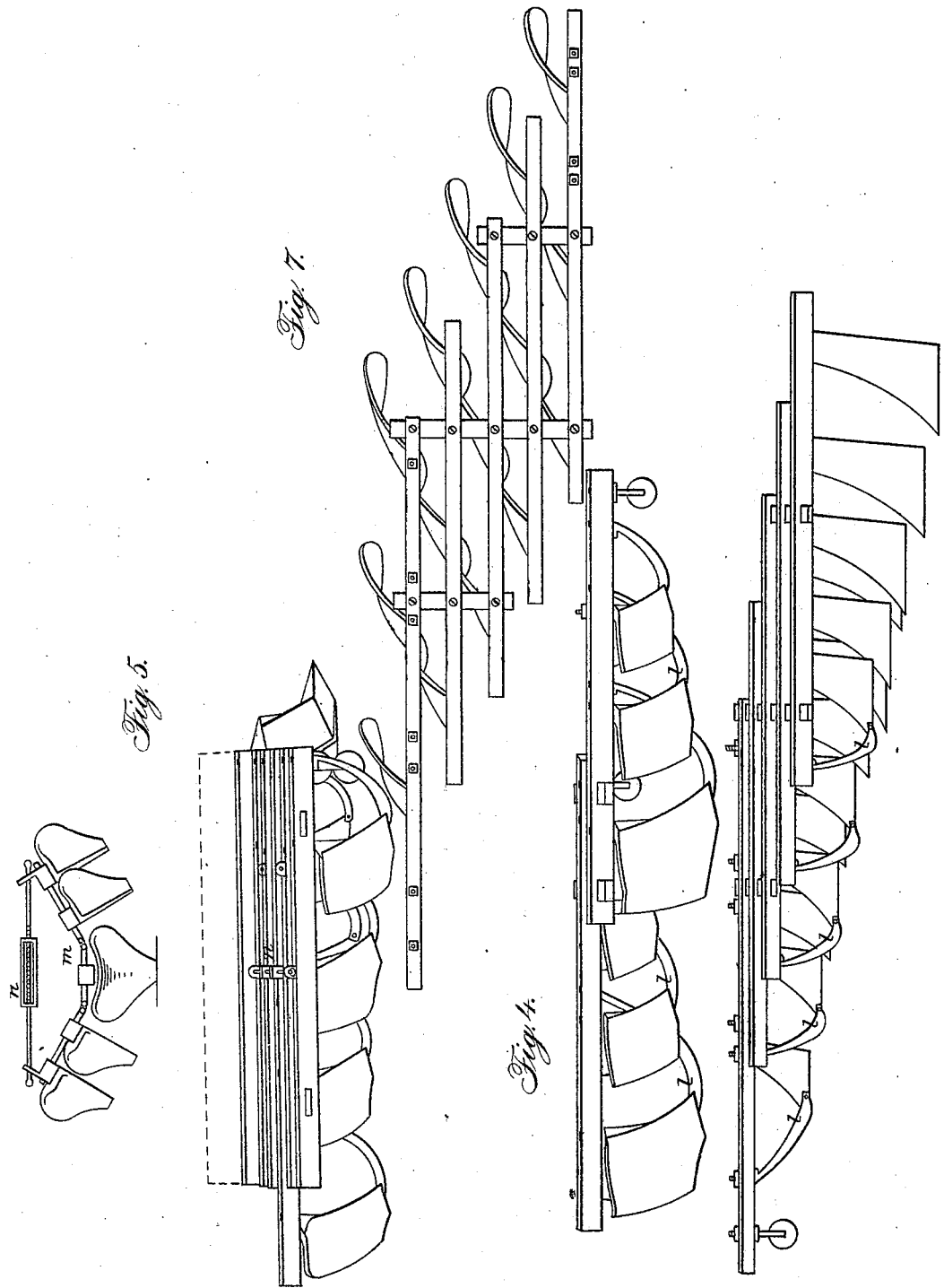

UNITED STATES PATENT OFFICE.

HENRY COWING, OF NEW ORLEANS, LOUISIANA.

IMPROVEMENT IN GANG-PLOWS.

Specification forming part of Letters Patent No. 7,795, dated November 26, 1850.

*To all whom it may concern:*

Be it known that I, HENRY COWING, of New Orleans, in the parish of Orleans and State of Louisiana, have invented certain new and useful improvements in power applicable to agricultural purposes and in machinery adapted thereto; and I do hereby delare that the following is a full, clear, and exact description of the principle or character which distinguishes them from all other things before known, and of the usual manner of making, modifying, and using the same, reference being had to the accompanying drawings, which form a part of this description, in which—

Figure 1:
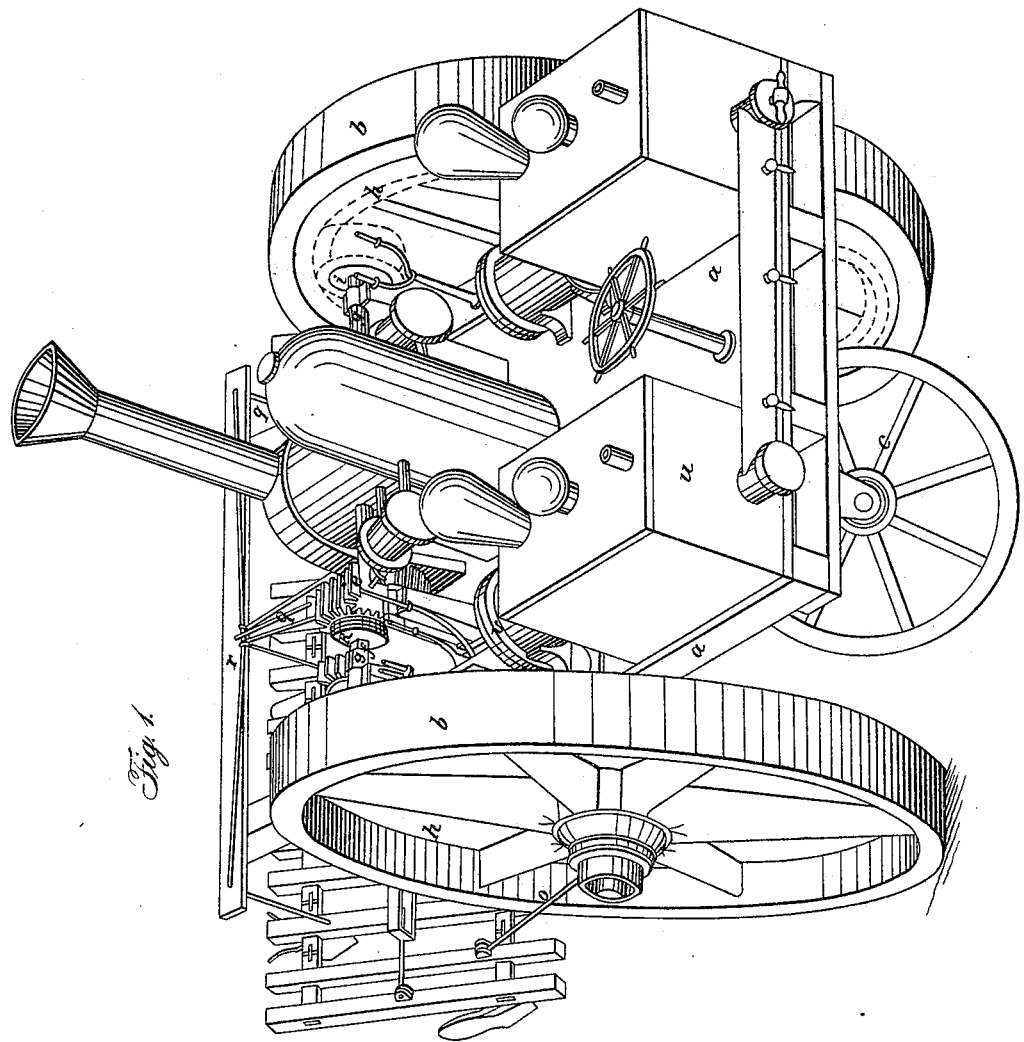
Figure 2:
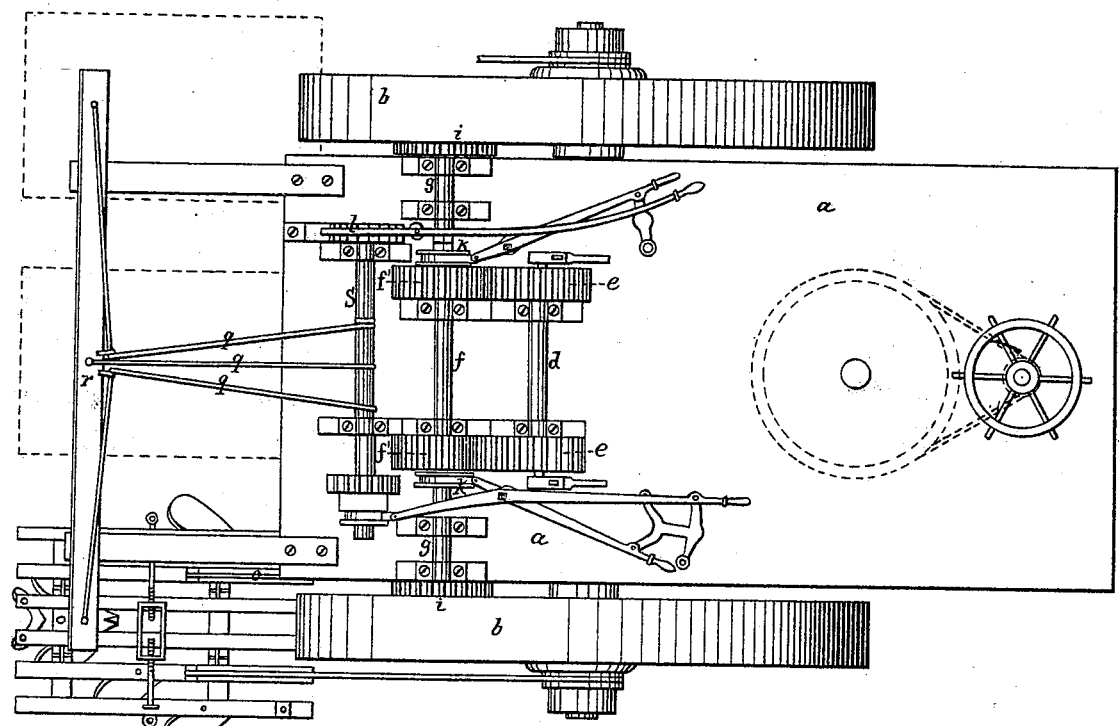
Figure 3:
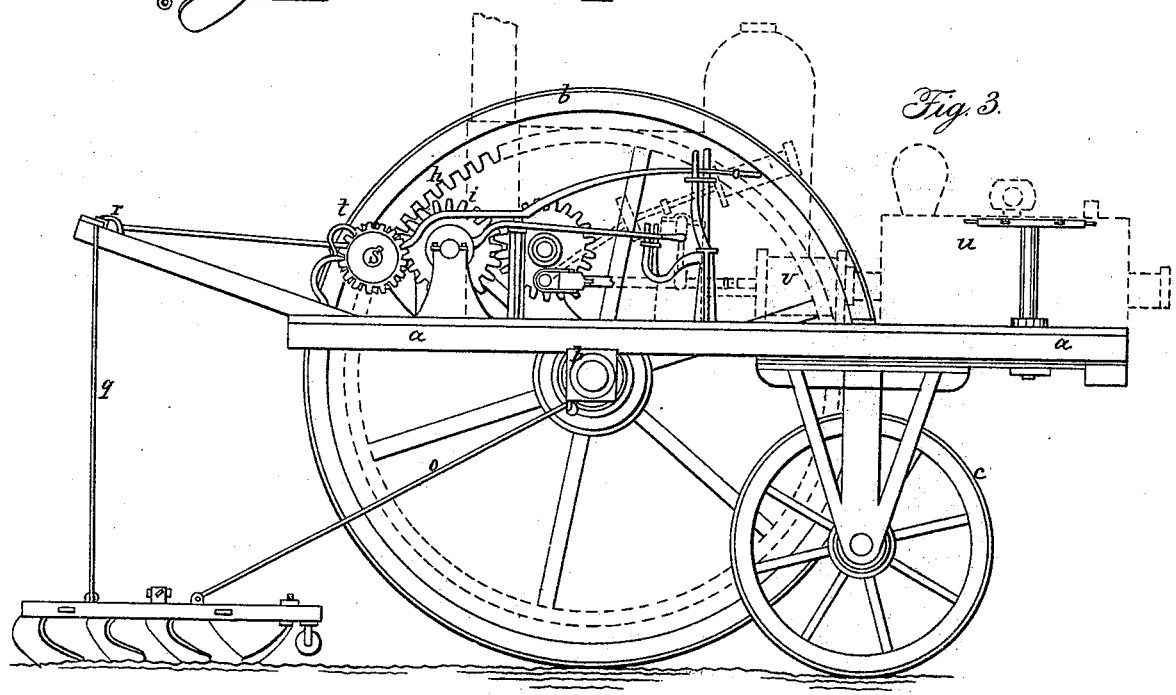

Figure 1 is a perspective view; Fig. 2, a bird's-eye view. Fig. 3 is a side elevation; Fig. 4, a gang of plows; Fig. 5, a gang of hilling-plows.

The object of my invention is to furnish to the agriculturist a labor-saving machine whereby steam may be profitably employed instead of manual labor or horse-power in ordinary field operations and elsewhere, especially in plowing and cultivating land. The construction of the apparatus is as follows:

I form a platform of stout frame-work $a$ $a$, which constitutes the carriage, and is mounted on two large driving-wheels, $b$, that turn on their axles as ordinary cart-wheels. These wheels have broad treads and should not be less than fourteen feet in diameter, the larger the better; but I do not confine myself to any particular size. In addition to these I employ one or more guiding-wheels, $c$, each of which is pivoted in a separate frame, so as to turn in any direction to steer the apparatus by.

Upon the platform an ordinary locomotive-engine is placed, the connecting-rods of which act upon a shaft, $d$, having on it two spur-wheels, $e$. These spur-wheels mesh into similar ones, $f'$, on a shaft, $f$ and $g$, that extends across to the outside bearing-wheels $b$, and is in three parts, on the inside of the rim of which wheels a cog-gear, $h$, is cut. Into this gear two pinions, $i$, work, that are on the ends of short shafts $g$ on a line with the shaft $f$, to which they may be coupled by a common clutch, $k$, by means of which the large wheels are turned to propel the carriage, and either or both may be connected at pleasure by the engineer, as occasion requires. This furnishes a valuable and convenient apparatus, that can be turned within its length, and forms a powerful auxiliary in all draft operations.

The plows adapted to this machine are various in their character, according to the service for which they are intended: First, for plowing deep and turning the sward completely under the subsoil I employ a gang of three or more plows, as shown, Fig. 4, each succeeding one of which follows deeper than the one that preceded and raises up a portion of the subsoil over that which is first removed. Each of these plows is furnished with a colter, that extends down in an angular direction backward from the beam to the point of the plow, as shown at $l$, Fig. 4. To pulverize the soil, a series of these gangs can be so arranged (see Fig. 5) as to throw the dirt from one to the other and loosen and mix it. For hilling land for cane, corn, &c., I use gangs of plows with joints in their frames, as shown at $m$, so that the side beams can be elevated permanently to any height by a cross-rod and adjusting-screw, $n$. This apparatus is all necessary with so powerful a motive agent, as otherwise the machinery would be broken, or, being on so extended a scale, would not lay the ground in the proper position for cultivating. These plows or gangs of plows are connected by a rod or bar, $a$, with the axle $p$ of the carriage, and to each frame there is a cord or chain, $g$, attached, that extends up over pulleys at $r$ in a portion of the carriage-frame that projects over the plows, and thence to a windlass or shaft, $s$, around which it winds. This shaft can be connected with the spur-wheel $f$, so as to raise the plows out of the ground by the steam-power to turn round or convey them to another part of the field. The windlass is held when the plows are elevated by a clutch and rack, $t$. The tender $u$ of the locomotive-engine is placed on the same platform with it, at the front end thereof. To it is attached a force-pump, $v$, connected with the engine for filling the tender, which pump can also be used for a fire-engine or draining apparatus. The details of much of this machinery are old; but their combination in this compact form for the various operations of a plantation are here first essayed.

My claims are as follows:

1. The inclined colters so arranged as to throw out the plows without breaking when they meet with an obstruction, in the manner and for the purpose set forth.

2. The apparatus shown at $n\ m$, Fig. 5, for setting the frames for hilling in the manner above specified.

HENRY COWING.

Witnesses:
J. J. GREENOUGH,
WM. GREENOUGH.